(12) United States Patent
Wighe et al.

(10) Patent No.: US 12,506,686 B2
(45) Date of Patent: *Dec. 23, 2025

(54) SYMMETRIC ROUTING IN VIRTUALIZED NETWORKS

(71) Applicant: Apple Inc., Cupertino, CA (US)

(72) Inventors: Chirag Wighe, Milpitas, CA (US); Samrat Ganguly, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,447

(22) Filed: Jan. 30, 2024

(65) Prior Publication Data

US 2024/0243999 A1     Jul. 18, 2024

Related U.S. Application Data

(63) Continuation of application No. 17/484,871, filed on Sep. 24, 2021, now Pat. No. 11,916,785.

(51) Int. Cl.
| | | |
|---|---|---|
| *H04L 29/12* | (2006.01) | |
| *H04L 9/40* | (2022.01) | |
| *H04L 12/24* | (2006.01) | |
| *H04L 12/46* | (2006.01) | |
| *H04L 45/586* | (2022.01) | |
| *H04W 40/24* | (2009.01) | |

(52) U.S. Cl.
CPC ........ *H04L 45/586* (2013.01); *H04L 12/4641* (2013.01); *H04L 63/0254* (2013.01); *H04L 63/0272* (2013.01)

(58) Field of Classification Search
CPC ....... H04L 45/04; H04L 45/586; H04L 45/50; H04L 61/103; H04L 12/4645; H04L 12/4641; H04L 45/00; H04L 45/70; H04L 45/02; H04L 45/74; H04L 41/5077; H04L 63/0254; H04L 63/0272; H04L 49/354; H04L 41/12; H04L 43/0811; H04W 40/248; G06F 8/36; G06Q 10/06
USPC ..................................... 370/395.53
See application file for complete search history.

(56) References Cited

U.S. PATENT DOCUMENTS

| | | | |
|---|---|---|---|
| 8,139,572 B1 * | 3/2012 | Distler .................. | H04L 45/04 370/389 |
| 8,634,428 B2 * | 1/2014 | Le Pennec .............. | H04L 45/36 370/392 |
| 8,789,135 B1 * | 7/2014 | Pani .................... | H04L 63/0209 726/13 |
| 10,313,241 B2 * | 6/2019 | Bethers ................ | H04L 45/026 |

(Continued)

OTHER PUBLICATIONS

Davies, Justin; "Introducing AWS Gateway Load Balancer: Supported architecture patterns"; https://aws.amazon.com/blogs/networking-and-content-delivery/introducing-aws-gateway-load-balancer-supported-architecture-patterns/; Nov. 11, 2020 (Year: 2020).*

(Continued)

*Primary Examiner* — Sithu Ko
*Assistant Examiner* — Vanneilian Lalchinthang
(74) *Attorney, Agent, or Firm* — FLETCHER YODER PC

(57) ABSTRACT

Embodiments disclosed herein relate to source-based symmetric routing of network traffic in virtual networks. In particular, a source of network traffic in the virtual network is equipped with a routing table that causes the source of the network traffic to route the network traffic symmetrically across zones of the virtual network.

20 Claims, 8 Drawing Sheets

(56) References Cited

U.S. PATENT DOCUMENTS

| | | | |
|---|---|---|---|
| 11,849,383 B2* | 12/2023 | Avva | H04L 45/66 |
| 2014/0278623 A1* | 9/2014 | Martinez | G06Q 10/06 |
| | | | 705/7.12 |
| 2014/0380125 A1* | 12/2014 | Calder | G06F 11/10 |
| | | | 714/766 |
| 2016/0285826 A1* | 9/2016 | Itskin | H04L 63/02 |
| 2016/0285913 A1* | 9/2016 | Itskin | H04L 45/74 |
| 2017/0126787 A1* | 5/2017 | Martinez | G06Q 10/06 |
| 2020/0177539 A1* | 6/2020 | Mittal | H04L 47/825 |

OTHER PUBLICATIONS

Davies, Justin; "Introducing AWS Gateway Load Balancer: Supported architecture patterns"; https://aws.amazon.com/blogs/networking-and-content-delivery/introducing-aws-gateway-load-balancer-supported-architecture-patterns/; Nov. 11, 2020.
International Search Report & Written Opinion for PCT Application No. PCT/US2022029873 dated Aug. 19, 2022; 17 pgs.

* cited by examiner

| | SOURCE | DEST | FW |
|---|---|---|---|
| 402 | 1 | Q | 1 |
| 404 | 1 | 1 | 1 |
| 406 | 1 | 3 | 1 |
| 408 | 1 | 2 | 2 |
| 410 | 2 | Q | 2 |
| 412 | 2 | 2 | 1 |
| 414 | 1 | 1 | 2 |
| 416 | 2 | 3 | 3 |
| 418 | 3 | Q | 3 |
| 420 | 3 | 3 | 3 |
| 422 | 3 | 1 | 1 |
| 424 | 3 | 2 | 3 |

SYMMETRIC ROUTING IN VIRTUALIZED NETWORKS

CROSS-REFERENCE TO RELATED APPLICATION

This application is a continuation of U.S. patent application Ser. No. 17/484,871 entitled "SYMMETRIC ROUTING IN VIRTUALIZED NETWORKS," filed on Sep. 24, 2021, which is hereby incorporated by reference in its entirety for all purposes.

BACKGROUND

The present disclosure relates generally to virtualized network routing, and more specifically, to techniques for providing symmetric routing via routing configuration at a network traffic source.

Today workloads in the Cloud as well as Data Centers are increasingly being deployed in virtual network containers. These containers are called Virtual Private Clouds (VPCs). The physical infrastructure on which VPCs and the compute workloads run is split into multiple zones. Each zone is redundant and does not share resources (e.g., hardware, power, etc.) with other zones. Hence each zone is an independent fault domain. Every region can have a variable number of such zones. When a VPC is created in a given region, it would offer compute workloads the choice to run in any of the zones. This allows workloads to be redundant and the failure of the single zone can be handled as the workloads can switch to a different zone. VPCs typically connect to the outside world using a network fabric. The network fabric can be zone agnostic and use resources across multiple zones. Additionally and/or alternatively, there could be multiple network fabrics, where each network fabric is dedicated to a given zone.

Stateful firewall services provide improved security as they use connection tracking to track session state and match reverse traffic. They are considered more secure than stateless firewalls. Stateful firewalls typically utilize dedicated hardware or software compute resources. As mentioned previously, this compute can belong to any zone in a region. Typically, these firewalls are deployed with multiple instances in each zone. An issue with stateful firewalls is the requirement to maintain state information. In a distributed firewall implementation where more than one firewall instance implements the firewall function, there is a requirement to synchronize state across all these instances across multiple zones, which is difficult to do at scale.

Traditional mapping of forward and reverse traffic to the same firewall instance involves the use of some form of symmetric hashing support in the network components. Typically, these are supported vendor switches and routers. Other systems use policy-based routing, where particular policy rules are implemented at the firewall instances to identify how to forward traffic. While these two approaches have become common in data centers, they have proven difficult to implement in virtualized network/cloud platforms. Indeed, in virtualized network environments, the number of sessions needing to be tracked may reach into millions or greater and the number of firewall gateways may be significant. Further, latency between the firewall gateways may be unpredictable, causing further complications to guarantee of synchronized routing rules across these devices. The techniques provided herein provide a novel approach to symmetric routing in the absence of these features.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The techniques provided herein provide symmetric routing to a given firewall in a deterministic manner, by configuring routing at the source of the traffic. The VPC is connected to multiple networks which are zone-specific. In other words, traffic can be sent to the network associated with Zone-1 to be processed by firewalls in Zone-1. The VPC is connected to all the zone networks in the given region. Using source-based routing, traffic is sent to a specific network in a symmetric manner such that the forward traffic and the reverse traffic are sent to the same firewall. As will be described in more detail below, the assignment of firewalls to these source/destination pairs can be done in many ways. For example, a firewall assignment to source/destination pairs could be implemented via a static mapping and/or a dynamic mapping, which may change from time to time (e.g., based on traffic load or other characteristic).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 4 is a schematic diagram, illustrating an example of a source-based symmetric routing table, in accordance with certain embodiments of the present disclosure;

DETAILED DESCRIPTION OF SPECIFIC EMBODIMENTS

Figure 1:
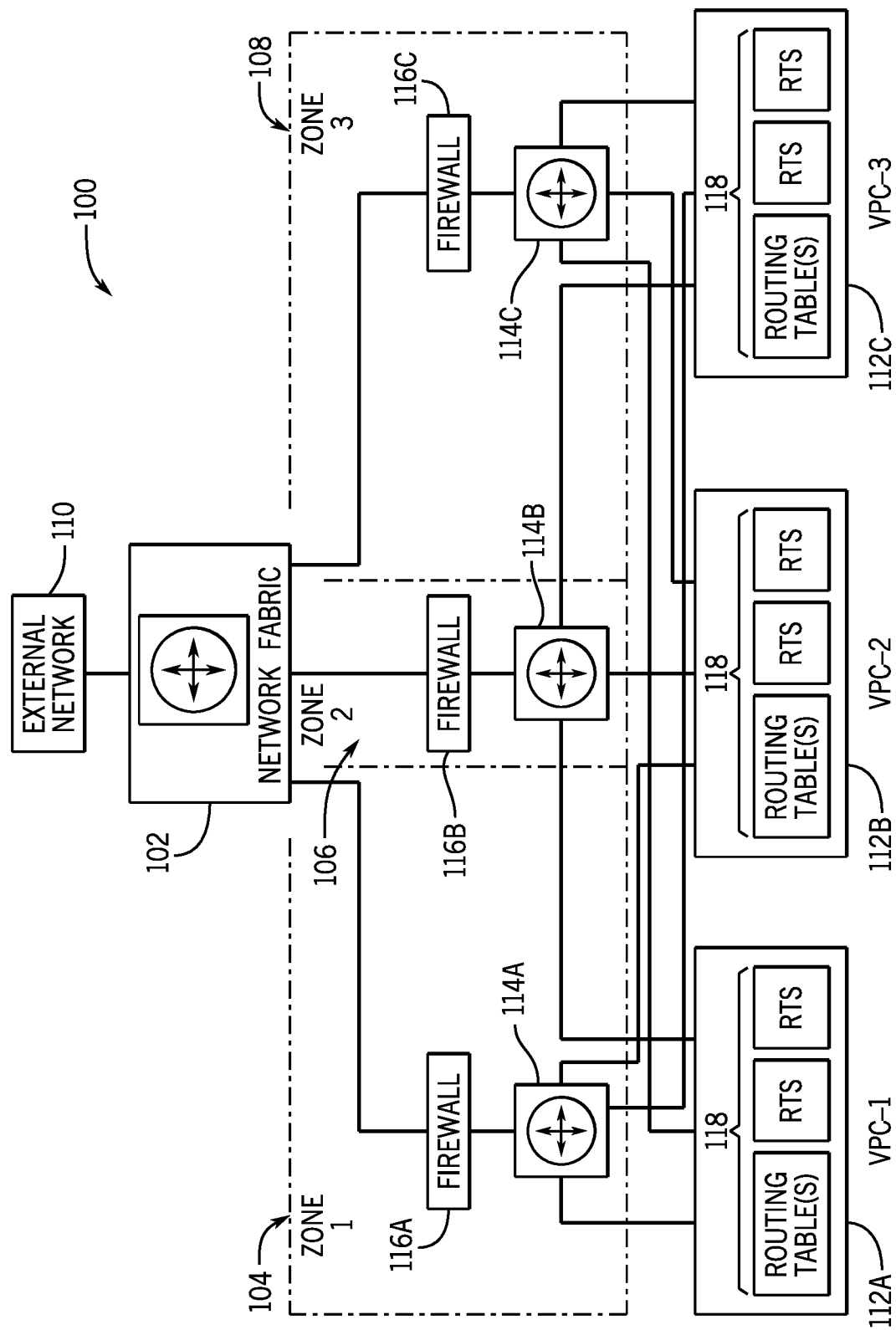
FIG. 1 is a block diagram of a virtual network system equipped to provide symmetric routing across firewall instances via source-based routing, in accordance with certain embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

As mentioned above, the current disclosure is directed to source-based symmetric routing, where a routing is configured at a source of the network traffic, alleviating a reliance on specialized symmetric routing hardware and/or complex policy rules implemented in the network fabric and/or firewall instances.

Advantageously, embodiments presented herein provide a far more efficient and scalable routing solution for symmetric routing in virtualized network environments. In particular, the source-based symmetric routing discussed herein provides a routing solution that, when compared to typical implementations of reliance on hardware-based symmetric route handing and policy-based routing, is relatively easy to implement, while providing flexibility and efficient route processing. Indeed, as mentioned above, in virtualized network environments, the number of sessions needing to be tracked may reach into millions or greater and the number of firewall gateways may be significant. Further, latency between the firewall gateways may be unpredictable, causing further complications to guarantee of synchronized routing rules across these devices.

Turning first to an overview of the source-based symmetric routing techniques described herein, FIG. 1 is a block diagram of a virtual network system 100 equipped to provide symmetric routing across firewall instances via source-based routing, in accordance with certain embodiments of the present disclosure. As illustrated, the virtual network system 100 includes a network fabric 102, which is a mesh of connections between network devices that provides a transport mechanism for data to and/or from zones (e.g., Zone 1 104, Zone 2 106, and/or Zone 3 108) and/or one or more external networks 110. As used herein, zones refer to a portion of a physical infrastructure assigned to service particular workloads/tasks of virtual network containers, such as virtual private clouds (VPCs). As illustrated, Zone 1 104 includes VPC1 112A, which is virtual network container configured to process particular tasks (e.g., a specific application). VPC1 112A is coupled to a Zone 1 network fabric 114A, which is communicatively coupled to a firewall instance 116A that secures Zone 1 104. As illustrated, VPC1 112A may communicate with Zone 2 106 an/or Zone 3 108 via firewall instances 116B of Zone 2 106 and/or firewall instance 116C of Zone 3 and/or Zone 2 network fabric 114B and/or Zone 3 network fabric 114c.

The VPCs 112A, 112B, and 112C are sources of network traffic in the virtual network system 100. To implement source-based symmetric routing, each source is provided a set of routing tables 118 (e.g., associated with a subnet of each zone 104, 106, 108) that provide a common firewall instance to route to for a given cross-zone pair. As used herein, a cross-zone pair is a pair of zones, used in forward and reverse traffic (e.g., Source Zone 1 and Destination Zone 2 would be a cross-zone pair with Source Zone 2 and Destination Zone 1). At each network traffic source (e.g., at a VPC providing traffic to transport over the virtual network system 100, a routing to a particular firewall instance assigned to the cross-zone pair associated with the network traffic is identified and performed. For example, network traffic that is generated from source VPC2 112B with a destination of VPC1 112A will have a common firewall instance assignment with network traffic that is generated from source VPC1 112A with a destination of VPC2 112B. This will ensure that VPC1 112A to VPC2 112B network traffic and any reverse transmissions will be assigned to a common firewall maintaining session information for the symmetric routing.

In some instances, network traffic may be intended from an external network 110. In such a scenario, in some embodiments, a firewall instance of the zone where the network traffic originated may be assigned to the network traffic, as this may provide network hardware closest to the network traffic source for transport of the network traffic. For instance, if VPC1 112A generates data to transport to the external network 110, the firewall 116A of Zone 1 104 may be assigned to the generated network traffic, as VPC1 112 is in zone 1 104 and is, thus, considered the source zone that should handle the network traffic.

Figure 2:
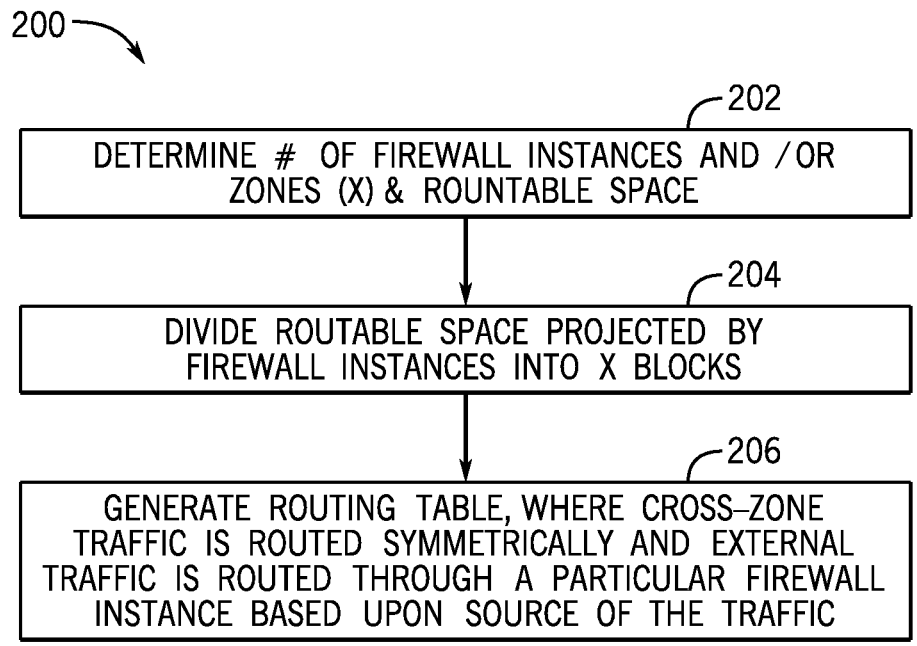
FIG. 2 is a flowchart, illustrating a process for generating source-based symmetric routing tables, in accordance with certain embodiments of the present disclosure.
Figure 3:
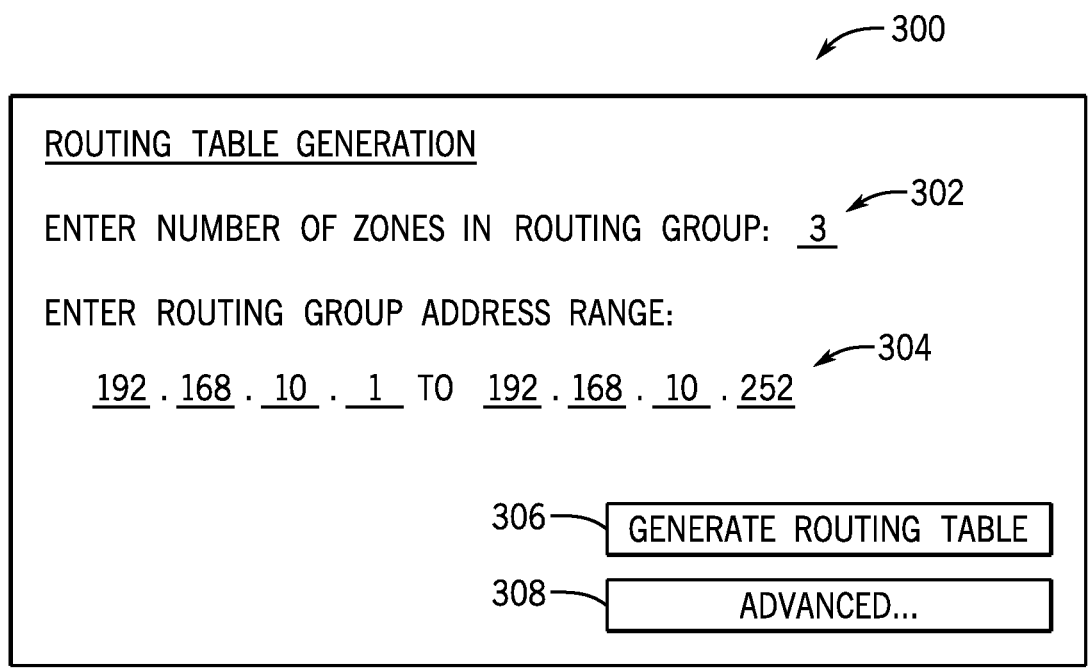
FIG. 3 is a schematic diagram of a graphical user interface (GUI) for generation of source-based symmetric routing tables, in accordance with certain embodiments of the present disclosure.

Having broadly discussed the concept of the source-based symmetric routing, the discussion now turns to generation of the routing tables 118 of FIG. 1. FIG. 2 is a flowchart, illustrating a process 200 for generating source-based symmetric routing tables, in accordance with certain embodiments of the present disclosure. Further, FIG. 3 is a schematic diagram of a graphical user interface (GUI) 300 for generation of source-based symmetric routing tables, in accordance with certain embodiments of the present disclosure. For brevity, FIGS. 2 and 3 will be discussed together.

The process 200 begins with determining a number of firewall instances and/or zones (X) in the virtual network system and a routable space protected by the firewall instances (block 202). A computer system implementing the process 200 may obtain this information via the GUI 300 of FIG. 3. The GUI 300 provides a prompt 302 for an operator to provide a number of zones in the routing group. Referring back to FIG. 1, it may be seen that there are three zones (and 3 associated firewall instances) that are present in the virtual network system 100. Thus, the operator has entered "3" in the GUI 300 prompt 302. Additionally, the GUI 300 includes a prompt 304 to enter a routable address range covered by the virtual network system 100. Here, the range is illustrated in IPV4 format, but any form of addressable range could be used (e.g., IPv6). The GUI 300 includes an affordance 306 to generate the routing tables for source-based symmetric routing. When selected, the affordance 306 may result in continuation of the process 200 of FIG. 2.

The process 200 continues by diving the routable space protected by the firewall instances into a number (X) of blocks corresponding to the number of firewall instances (block 204). Using the example provided in FIG. 3, there are 252 addresses provided via the prompt 304. These addresses are divided into 3 blocks (e.g., the number provided in prompt 302 of FIG. 3), resulting in 3 blocks, each with 84 addresses. Each of these blocks can be assigned to a particular zone/firewall instance. For example, the first block of 84 addresses may be assigned to Zone 1 104 (which contains firewall instance 116A), the second block of 84 addresses may be assigned to Zone 2 106 (which contains firewall instance 116B, and the third block of 84 addresses may be assigned to Zone 3 108. In this manner, the range of protected addresses is balanced, in assignment, to each of the zones of the virtual network system 100. It is important to note that embodiments are not limited to such balancing of assignment of addresses to zones. For example, if a network administrator were to want an unbalanced assignment of addresses to particular zones, the operator could select the advanced option affordance 308, which could lead to a prompt allowing for particular sub-ranges of the routing group address range to be specified for assignment to particular zones. In this manner, unbalanced assignment may be enabled. Further, additional advanced features may be facilitated by GUIs triggered from selection of the advanced option affordance 308. For example, the network administrator may set dynamic alterations to the firewall instance assignments based upon certain characteristics and/or events, as will be discussed in more detail below.

The process 200 completes with generation of the routing tables (block 206). The routing tables will indicate routings for the particular blocks of addresses, where cross-zone traffic is routed symmetrically and external traffic (e.g., traffic with a destination outside of the routable space/routing group address range) is assigned to a particular firewall instance associated with the source of the network traffic.

Figure 5:
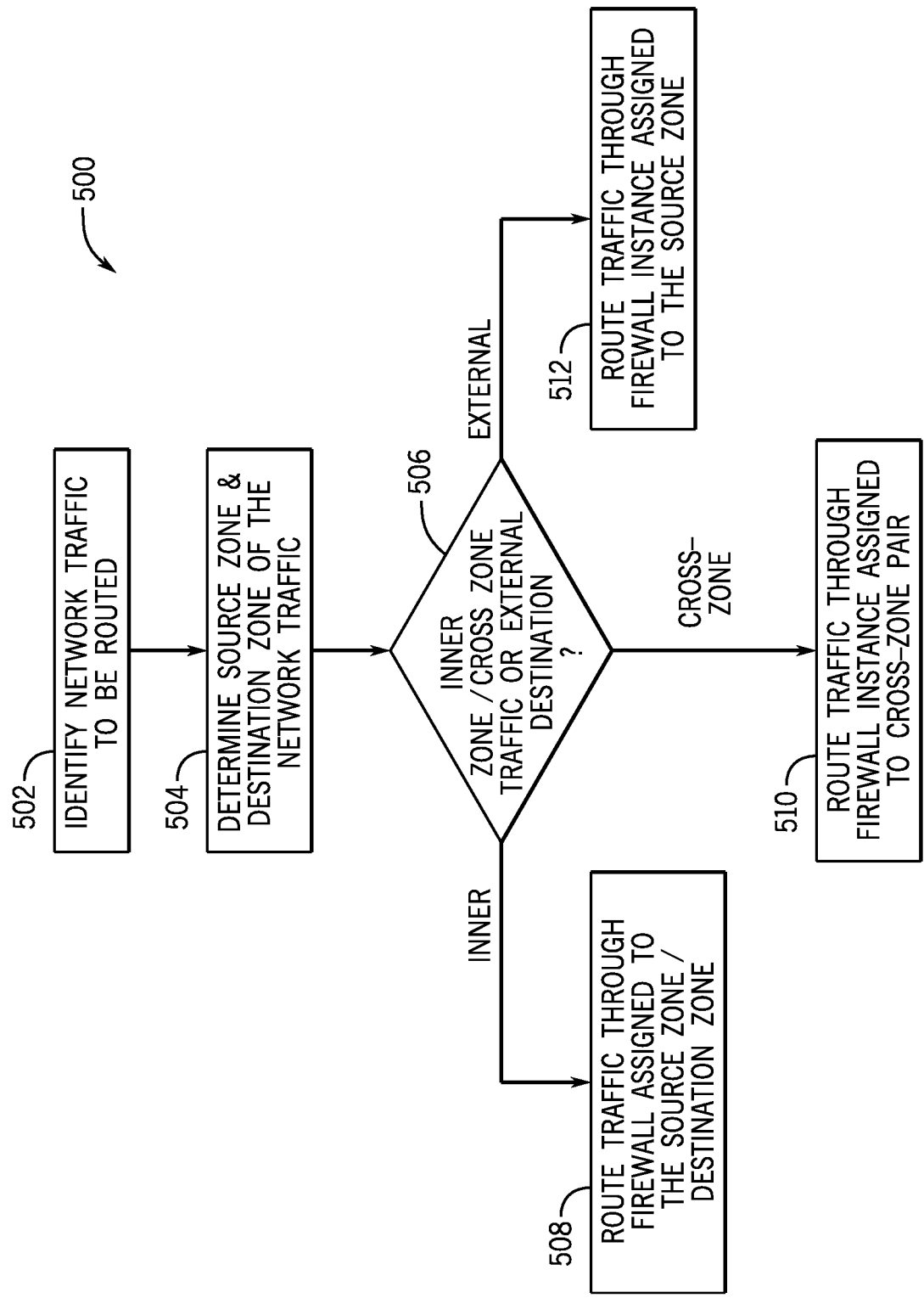
FIG. 5 is a flowchart, illustrating a process for source-based symmetric routing, instructed by the source-based symmetric routing tables, such as the one illustrated in FIG. 4, in accordance with certain embodiments of the present disclosure.

Having discussed the process 200 for generating a source-based symmetric routing table, FIG. 4 is a schematic diagram, illustrating an example of a source-based symmetric routing table 400, in accordance with certain embodiments of the present disclosure. FIG. 5 is a flowchart, illustrating a process 500, implemented by the network traffic source, for source-based symmetric routing, instructed by the source-based symmetric routing tables, such as the one illustrated in FIG. 4, in accordance with certain embodiments of the present disclosure. For brevity, FIGS. 4 and 5 will be discussed together.

As illustrated, the source-based symmetric routing table 400 has entries for each combination of source and destination zones for the set of zones of the virtual network system 100. Since the virtual network system 100 of FIG. 1 includes three zones/firewall instances, entries for each cross-zone combination of these three zones and the three zones to an external destination are generated in the routing table 400.

To make use of the routing table 400, the process 500 begins by identifying network traffic to be routed (block 502) and determining a source and destination of the zone of the network traffic (block 504). The network traffic may include an associated source address and destination address, which may be used to identify the source zone and the destination zone. For example, as mentioned above, each zone may be associated with a subset of addresses of the range of routable space protected by the firewall instances of the virtual network system 100. Address subsets containing the source address and the destination address may be identified and used to determine the source and destination zones (e.g., by identifying the zones associated with the identified subsets).

Once the source and destination zones are identified, a determination is made as to whether the network traffic is inner zone traffic (e.g., traffic that is both sourced from and destined for a common zone), cross-zone traffic (e.g., sourced from one zone and destined for another zone), or is network traffic destined for an external network (decision block 506).

When inner zone network traffic is present, the firewall instance of the zone associated with the source and destination of the network traffic may be assigned for the network traffic (block 508). Accordingly, inner zone entries may be generated and included in the routing table 400. As illustrated in entry 404, inner-Zone 1 traffic is routed to the firewall instance associated with Zone 1 (firewall instance 116A). Entry 412 provides routing rules for inner-Zone 2 traffic, which is routed to the firewall instance of Zone 2 (firewall instance 116B). Entry 420 provides routing rules for inner-Zone 3 traffic, which is routed to the firewall instance of Zone 3 (firewall instance 116C).

When cross-zone network traffic is present, the network traffic is routed through the firewall instance assigned to the cross-zone pair (block 510). Cross-zone pair entries are generated, such that traffic of these pairs is routed symmetrically. For example, entries 408 and 414 provide entries for the Zone 1/Zone 2 cross-zone pair, where entry 408 is a routing rule for network traffic sourced from Zone 1 and destined for Zone 2 and entry 414 is a routing rule for network traffic sourced from Zone 2 and destined for Zone 1. In both cases, the network traffic is routed to the firewall instance of Zone 2 (firewall instance 116B). Thus, this creates symmetric routing between these zones without further effort. Entries 406 and 422 illustrate the routing rules for the Zone 1/Zone 3 cross-zone pair, where this pair is assigned to the firewall instance of Zone 1 (firewall instance 116A). Entries 416 and 424 illustrate the routing rules for the Zone 2/Zone 3 cross-zone pair, where this pair is assigned to the firewall instance of Zone 3 (firewall instance 116C).

When external network traffic is present, this network traffic is routed through the firewall instance assigned to the source zone (block 512). To do this, external network entries are generated and provided in the routing table 400. In FIG. 4, external network destinations are represented by "Q". Entry 402 illustrates that if a network traffic source of Zone 1 104 (e.g., VPC1 112A of FIG. 1) generates external network traffic, the network traffic should be routed to firewall instance of Zone 1 104 (e.g., firewall instance 116A). For example, external network traffic destined to Zone 1 104 will be automatically routed to firewall instance 116A, as the destination address will be one assigned to Zone 1 104. Entries 410 and 418 each illustrate similar entries for network traffic sourced from Zone 2 106 and Zone 3 108, respectively. As illustrated, externally destined network traffic sourced from Zone 2 106 is routed to the firewall instance of Zone 2 106 (firewall instance 116B) and externally destined network traffic sourced from Zone 3 108 is routed to the firewall instance of Zone 3 108 (firewall instance 116C).

As mentioned above, in some instances, it may be desirable to dynamically alter routings in response to certain usability metrics or events. For example, if certain zones receive more inner-zone traffic than other zones, it may be useful to re-balance firewall assignments for cross-zone traffic to remove firewall assignments to the firewall instance associated with the zone with relatively more inner-zone traffic.

Figure 6:
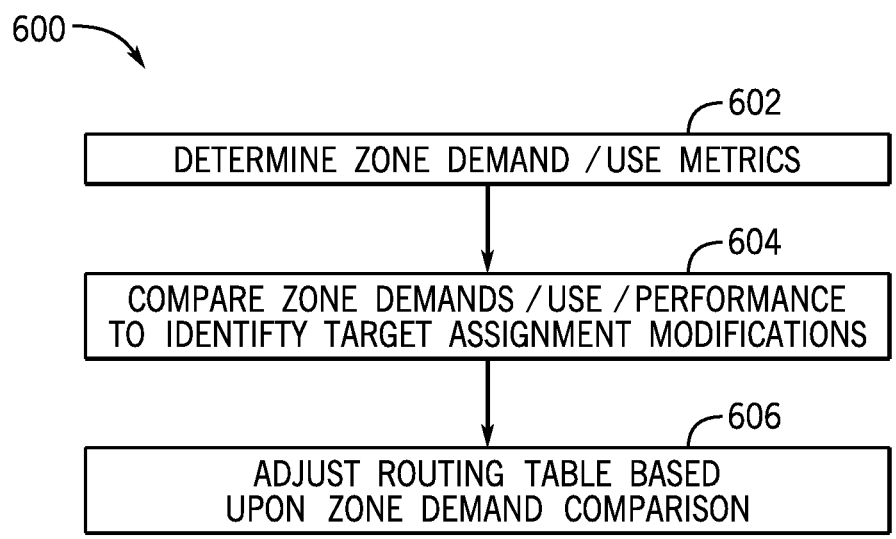
FIG. 6 is a flowchart, illustrating a process for dynamic adjustment of source-based symmetric routing tables, in accordance with certain embodiments of the present disclosure.
Figure 7:
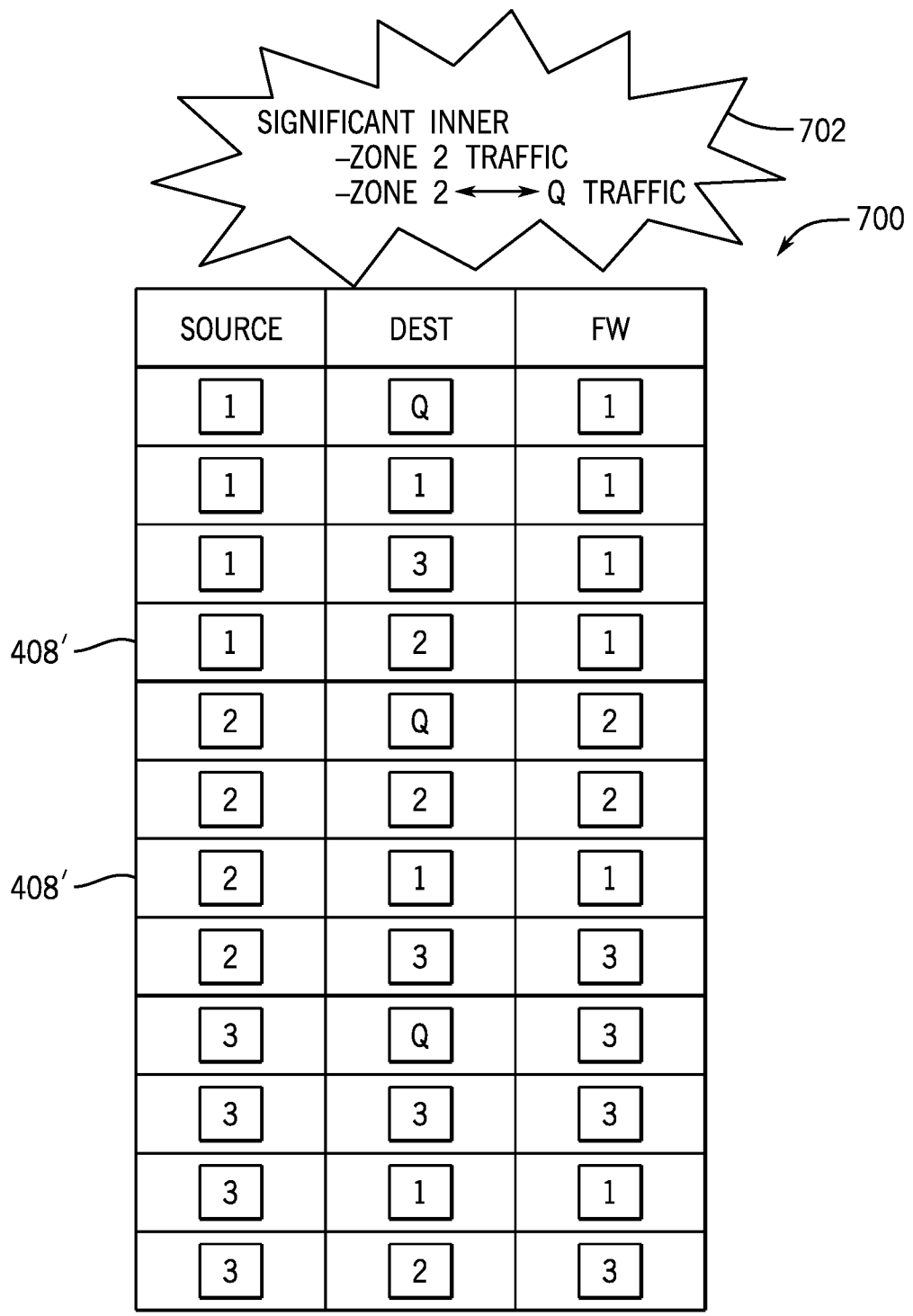
FIG. 7 is a schematic diagram, illustrating an example of the source-based symmetric routing table of FIG. 5 that has been adjusted in accordance with the process of FIG. 6, in accordance with certain embodiments of the present disclosure.

FIG. 6 is a flowchart, illustrating a process 600 for dynamic adjustment of source-based symmetric routing tables, in accordance with certain embodiments of the present disclosure. FIG. 7 is a schematic diagram, illustrating an example of the source-based symmetric routing table 700 of FIG. 5 that has been adjusted in accordance with the process of FIG. 6, in accordance with certain embodiments of the present disclosure. For brevity, FIGS. 6 and 7 will be discussed together.

The process 600 begins by receiving zone demand and/or use metric (block 602). For example, the virtual network system 100 of FIG. 1 may track usage metrics to understand VPC/zone usage and/or performance metrics of the various zones. For example, usage metrics may provide an indication of an amount of network traffic received and/or sent from a zone, particular types (e.g., inner-zone, cross-zone, and/or external) and/or amounts of particular types of network traffic received in a zone, etc. Performance metrics may include operational statistics such as firewall instance latency rates, etc.

From time to time, it may be beneficial to modify assignments to a particular firewall instance based upon these usage and/or performance metrics. It may be beneficial to compare zone demands, use and/or performance metrics to identify under-performing and or potentially over-utilized firewall instances, with respect to other firewall instances within the virtual network system 100. This may help identify potential target firewall instance assignment modification that could be made (block 604).

For example, in FIG. 7, usage metrics 702 indicate that there is a significant inner-Zone 2 traffic and Zone 2 to external traffic, at least with respect to other zones in the virtual network system 100. Accordingly, a target modification to reduce Zone 2 firewall instance assignments for cross-zone traffic may be identified, as the firewall instance associated with Zone 2 is experiencing high demand with both inner-zone and external network traffic.

The routing table may be adjusted based on the zone demand comparison/identified target assignment modifications (block 606). Returning to our example in FIG. 7, if the target assignment modification is to reduce cross-zone assignments for the Zone 2 firewall instance, entries 408 and 414 of FIG. 4 may be adjusted to re-assign routing of this cross-zone pair to the Zone 1 firewall instance. For example, in FIG. 7 entries 508' and 414' adjust the Zone1/Zone2 cross-zone pair to route to the Zone 1 firewall instance, in lieu of the prior Zone 2 firewall instance, thus potentially alleviating some of the demand on the Zone 2 firewall instance.

It is important to note that changes to the routing rules should not be implemented until existing symmetric communications of VPCs using the old rules have been completed or otherwise handled. To do this, routing table updates, in some embodiments, may be delayed until there is no network traffic present that will be affected by the rules. For example, in some embodiments, entries 408 and 414 may not be updated until there is no Zone1/Zone2 cross-zone pair network traffic on the virtual network system 100. This may help ensure that the proper session data is maintained with a particular symmetric communication.

In some instances, when these types of updates with be provided, session information from one firewall instance may be provided to another firewall instance, enabling the newly routed to firewall instance to provide the session data. Returning to the example of FIG. 7, session information regarding the Zone1/Zone2 cross-zone pair that is held by the Zone 2 firewall instance may be mirrored to the Zone 1 firewall instance, enabling the Firewall 1 instance to take over the session for the Zone 2 firewall instance. Upon completion of the mirroring, the updates resulting in entries 408' and 414' may be committed.

Figure 8:
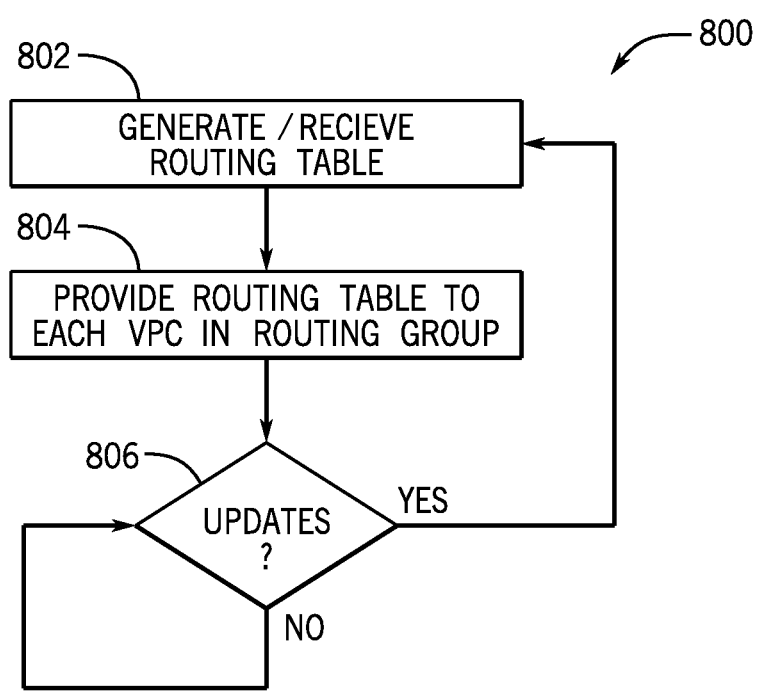
FIG. 8 is a flowchart, illustrating a process for implementing source-based symmetric routing in a virtualized network environment, in accordance with certain embodiments of the present disclosure.

Having discussed generation and updating of the routing tables, FIG. 8 is a flowchart, illustrating a process 800 for implementing source-based symmetric routing in a virtualized network environment, in accordance with certain embodiments of the present disclosure. The process 800 begins with generating and/or receiving a routing table (block 802). Techniques for generating the routing table are described above, with respect to FIG. 2.

Upon generating/receiving the routing table, the routing table is provided to each VPC in the routing group (block 804). In some embodiments, the routing table may be provided as part of a provisioning of the VPC, ensuring the routing tables are able to perform the source-based symmetric routing. In other embodiments, the routing tables are provided post-provisioning of the VPCs.

As mentioned above, certain updates may be made to the routing tables (e.g., to reduce over-use of a particular zone firewall instance). Accordingly, a determination as to whether routing table updates are available is made (decision block 806). If no updates are available, a periodic poll is continually run to identify if updates become available. Once updates are available, the process 800 begins again, by generating/receiving a routing table with the updates.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A tangible, non-transitory, computer-readable medium, comprising instructions that, when executed by processing circuitry, are configured to cause the processing circuitry to:
generate a routing table comprising one or more table entries, wherein each of the one or more table entries comprise a first zone, a second zone, and a firewall assignment;
receive an indication of an amount of inner-zone network traffic, an amount of cross-zone network traffic, and an amount of external network traffic associated with each of the first zone and the second zone; and
adjust the one or more table entries based on the amount of inner-zone network traffic, the amount of cross-zone network traffic, and the amount of external network traffic.

2. The tangible, non-transitory, computer-readable medium of claim 1, wherein the instructions are configured to cause the processing circuitry to generate an updated routing table based on the adjusted one or more table entries and provide the updated routing table to a plurality of network traffic sources.

3. The tangible, non-transitory, computer-readable medium of claim 1, wherein the instructions are configured to cause the processing circuitry to determine that a firewall associated with the firewall assignment is underperforming or over-utilized.

4. The tangible, non-transitory, computer-readable medium of claim 3, wherein the instructions are configured to cause the processing circuitry to modify the firewall assignment for the first zone and the second zone based on determining that the firewall associated with the firewall assignment is underperforming or over-utilized.

5. The tangible, non-transitory, computer-readable medium of claim 4, wherein the instructions are configured to cause the processing circuitry to adjust the one or more table entries based on modifying the firewall assignment.

6. The tangible, non-transitory, computer-readable medium of claim 5, wherein the instructions are configured to cause the processing circuitry to provide session data associated with modifying the firewall assignment.

7. The tangible, non-transitory, computer-readable medium of claim 1, wherein the amount of inner-zone network traffic, the amount of cross-zone network traffic, and the amount of external network traffic comprises the amount of inner-zone network traffic, the amount of cross-zone network traffic, and the amount of external network traffic received from the first zone and the second zone, the amount of inner-zone network traffic, the amount of cross-zone network traffic, and the amount of external network traffic sent from the first zone and the second zone, or both.

8. The tangible, non-transitory, computer-readable medium of claim 1, wherein the instructions are configured to cause the processing circuitry to determine network traffic between the first zone and the second zone.

9. The tangible, non-transitory, computer-readable medium of claim 8, wherein the instructions are configured to cause the processing circuitry to delay adjusting the one or more table entries based on the network traffic.

10. The tangible, non-transitory, computer-readable medium of claim 1, wherein the instructions are configured to cause the processing circuitry to execute a periodic poll to determine whether an update for the routing table is available.

11. The tangible, non-transitory, computer-readable medium of claim 1, wherein the instructions are configured to cause the processing circuitry to adjust the one or more table entries based on comparing the amount of inner-zone network traffic, the amount of cross-zone network traffic, or the amount of external network traffic to a performance metric.

12. The tangible, non-transitory, computer-readable medium of claim 11, wherein the performance metric is associated with an operational statistic.

13. The tangible, non-transitory, computer-readable medium of claim 12, wherein the operational statistic comprises a firewall latency rate of a firewall associated with the firewall assignment.

14. A method comprising:
generating a routing table comprising one or more table entries, wherein each of the one or more table entries comprise a first zone, a second zone, and a firewall assignment;
receiving an indication of an amount of inner-zone network traffic, an amount of cross-zone network traffic, and an amount of external network traffic associated with each of the first zone and the second zone;
adjusting the one or more table entries based on the amount of inner-zone network traffic, the amount of cross-zone network traffic, and the amount of external network traffic;
generating an updated routing table based on the adjusted one or more table entries; and
providing the updated routing table to a virtual private cloud.

15. The method of claim 14, comprising determining a firewall associated with the firewall assignment is underperforming or over-utilized.

16. The method of claim 15, comprising modifying the firewall assignment based on determining that the firewall associated with the firewall assignment is underperforming or over-utilized.

17. The method of claim 16, comprising adjusting the one or more table entries based on modifying the firewall assignment.

18. The method of claim 14, comprising:
determining network traffic between the first zone and the second zone; and
delaying adjusting the one or more table entries based on the network traffic.

19. A virtual network system, comprising:
a plurality of zones; and
a computer system configured to:
generate a routing table comprising one or more table entries, wherein each of the one or more table entries comprise a first zone of the plurality of zones, a second zone of the plurality of zones, and a firewall assignment, and wherein a first set of entries of the one or more table entries is associated with inner-zone traffic, a second set of entries of the one or more table entries is associated with cross-zone traffic, and a third set of entries of the one or more table entries is associated with external network traffic;

receive zone metrics associated with each of the first zone and the second zone;

adjust the one or more table entries based on the zone metrics; and generate an updated routing table based on the adjusted one or more table entries.

20. The virtual network system of claim 19, wherein the virtual network system comprises a plurality of virtual private clouds, and wherein the computer system is configured to provide the updated routing table to the plurality of virtual private clouds.

\* \* \* \* \*